(12) United States Patent
Peter et al.

(10) Patent No.: US 11,013,994 B2
(45) Date of Patent: May 25, 2021

(54) METHOD FOR PLAYING BACK APPLICATIONS FROM A CLOUD, TELECOMMUNICATION NETWORK FOR STREAMING AND FOR REPLAYING APPLICATIONS (APPS) VIA A SPECIFIC TELECOMMUNICATION SYSTEM, AND USE OF A TELECOMMUNICATION NETWORK FOR STREAMING AND REPLAYING APPLICATIONS (APPS)

(71) Applicant: Gorillabox GmbH, Hamburg (DE)

(72) Inventors: Frederik Peter, Hamburg (DE); Sheikh Khalil, Hayes (GB); Remco Westermann, Düsseldorf (DE)

(*) Notice: Subject to any disclaimer, the term of this patent is extended or adjusted under 35 U.S.C. 154(b) by 0 days.

(21) Appl. No.: 16/061,931

(22) PCT Filed: Dec. 21, 2015

(86) PCT No.: PCT/EP2015/002585
§ 371 (c)(1),
(2) Date: Jun. 13, 2018

(87) PCT Pub. No.: WO2017/108067
PCT Pub. Date: Jun. 29, 2017

(65) Prior Publication Data
US 2018/0361236 A1    Dec. 20, 2018

(51) Int. Cl.
*A63F 13/355* (2014.01)
*A63F 13/2145* (2014.01)
*A63F 13/352* (2014.01)

(52) U.S. Cl.
CPC ........ *A63F 13/355* (2014.09); *A63F 13/2145* (2014.09); *A63F 13/352* (2014.09)

(58) Field of Classification Search
None
See application file for complete search history.

(56) References Cited

U.S. PATENT DOCUMENTS

| | | | |
|---|---|---|---|
| 9,381,432 B2* | 7/2016 | Justice | A63F 13/12 |
| 9,451,043 B2* | 9/2016 | Zhao | H04L 67/08 |
| 9,744,458 B2* | 8/2017 | Yudintsev | A63F 13/537 |
| 2008/0172661 A1* | 7/2008 | Chatterjee | G06F 8/443 |
| | | | 717/158 |
| 2008/0268947 A1* | 10/2008 | Fyock | H04L 67/38 |
| | | | 463/29 |

(Continued)

FOREIGN PATENT DOCUMENTS

| | | |
|---|---|---|
| WO | 2009/073830 A1 | 6/2009 |
| WO | 2010/141522 A1 | 12/2010 |
| WO | 2012/037170 A1 | 3/2012 |

OTHER PUBLICATIONS

International Search Report for PCT/EP2015/002585, dated Feb. 1, 2017, and English Translation submitted herewith (7 pgs.)

(Continued)

*Primary Examiner* — Seng H Lim
(74) *Attorney, Agent, or Firm* — Wood IP LLC

(57) ABSTRACT

The invention discloses how even underdeveloped regions can be provided with telecommnunication terminals (mobile terminals, tablets, laptops) using little computing power of the telecommunication terminals, thus allowing a participation in the exchange of digital information.

7 Claims, 2 Drawing Sheets

(56) References Cited

U.S. PATENT DOCUMENTS

| | | | | |
|---|---|---|---|---|
| 2009/0019134 | A1* | 1/2009 | Bellifemine | H04W 12/06 709/218 |
| 2009/0125968 | A1* | 5/2009 | Perlman | H04N 21/4147 725/133 |
| 2010/0167809 | A1* | 7/2010 | Perlman | H04N 21/4781 463/24 |
| 2011/0270721 | A1* | 11/2011 | Kusterer | G06Q 40/125 705/32 |
| 2011/0289134 | A1* | 11/2011 | de los Reyes | H04L 63/205 709/203 |
| 2012/0283018 | A1* | 11/2012 | Berner | A63F 13/12 463/42 |
| 2013/0091557 | A1* | 4/2013 | Gurrapu | G06F 21/53 726/5 |
| 2013/0137520 | A1* | 5/2013 | Kim | H04L 65/4069 463/42 |
| 2013/0198085 | A1* | 8/2013 | Li | G06F 21/105 705/59 |
| 2013/0205206 | A1* | 8/2013 | Hawver | G06F 9/485 715/704 |
| 2014/0025521 | A1* | 1/2014 | Alsina | G06Q 30/0601 705/26.1 |
| 2014/0057722 | A1* | 2/2014 | Justice | A63F 13/10 463/42 |
| 2014/0073428 | A1 | 3/2014 | Perry et al. | |
| 2014/0201366 | A1* | 7/2014 | Kamp | H04W 12/06 709/225 |
| 2014/0317615 | A1* | 10/2014 | Ma | G06F 8/61 717/176 |
| 2014/0365384 | A1* | 12/2014 | Mowatt | G06Q 50/184 705/310 |
| 2015/0011311 | A1* | 1/2015 | Relan | A63F 13/355 463/31 |
| 2015/0066613 | A1* | 3/2015 | Zhou | G06Q 30/0209 705/14.12 |
| 2015/0081764 | A1* | 3/2015 | Zhao | H04L 67/08 709/203 |
| 2015/0082239 | A1* | 3/2015 | Zhao | A63F 13/00 715/788 |
| 2015/0087414 | A1* | 3/2015 | Chen | A63F 13/355 463/31 |
| 2015/0133218 | A1* | 5/2015 | Yudintsev | A63F 13/355 463/31 |
| 2015/0195372 | A1* | 7/2015 | Zheng | H04L 67/04 709/217 |
| 2016/0001184 | A1* | 1/2016 | Sepulveda | A63F 13/803 463/31 |
| 2016/0001187 | A1* | 1/2016 | Sepulveda | A63F 13/77 463/31 |
| 2016/0103594 | A1* | 4/2016 | Greenberg | G06F 3/0488 715/255 |
| 2017/0076262 | A1* | 3/2017 | Xing | G06Q 20/123 |
| 2017/0126661 | A1* | 5/2017 | Brannon | H04L 63/0823 |
| 2018/0243651 | A1* | 8/2018 | Peter | A63F 13/355 |

OTHER PUBLICATIONS

Wikipedia: "OnLive", Dec. 20, 2015 (Dec. 20, 2015), XP055336104, Retrieved from the Internet: URL:https://en.wikipedia.org/w/index.php?title=Onlive&oldid=696059026 [retrieved—on Jan. 17, 2017], p. 1-p. 3.

Claypool Mark et al: "On the performance of OnLive thin client games", Multimedia Systems, ACM, New York, NY, US, vol. 20, No. 5, Feb. 22, 2014 (Feb. 22, 2014), pp. 471-484, XP035394453.

* cited by examiner

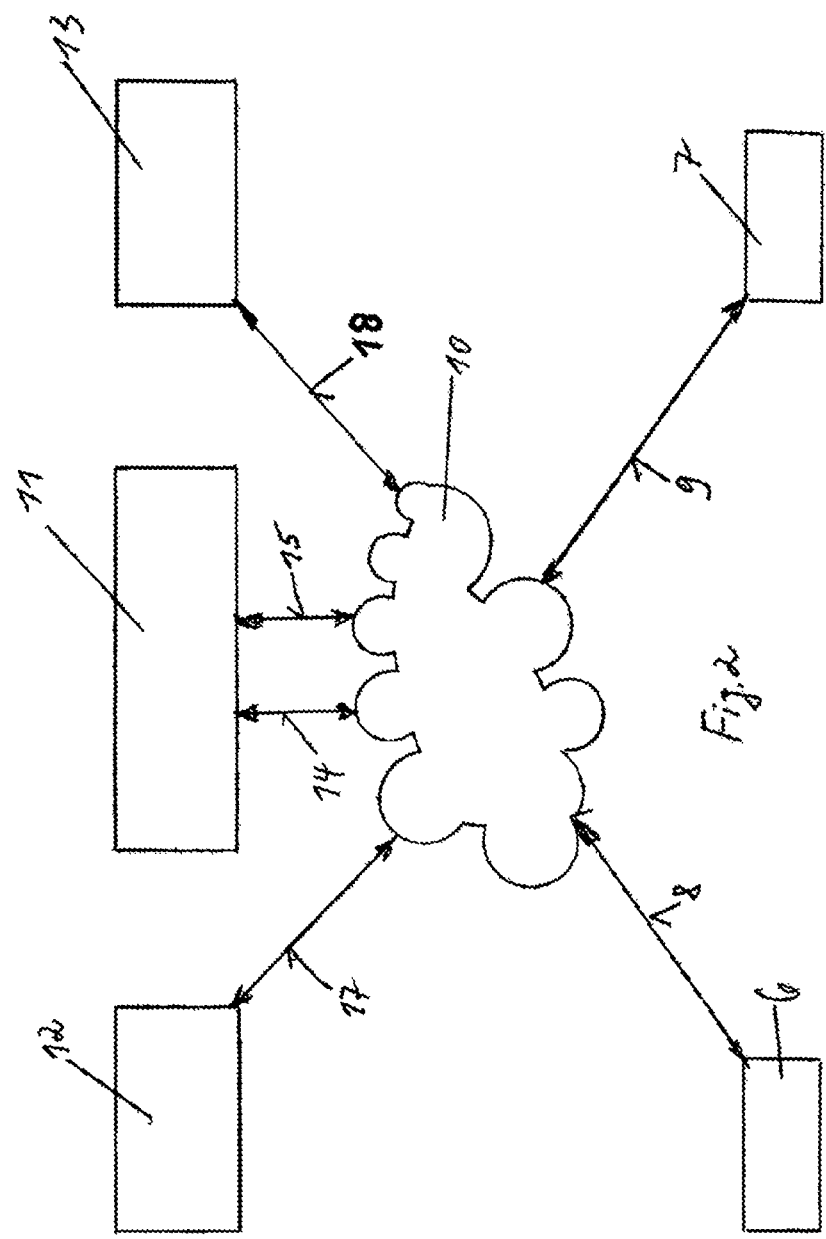

METHOD FOR PLAYING BACK APPLICATIONS FROM A CLOUD, TELECOMMUNICATION NETWORK FOR STREAMING AND FOR REPLAYING APPLICATIONS (APPS) VIA A SPECIFIC TELECOMMUNICATION SYSTEM, AND USE OF A TELECOMMUNICATION NETWORK FOR STREAMING AND REPLAYING APPLICATIONS (APPS)

CROSS-REFERENCE TO RELATED APPLICATIONS

This application is a U.S. national phase application filed under 35 U.S.C. § 371 of International Application No. PCT/EP2015/002585, filed Dec. 21, 2015, designating the United States, which is hereby incorporated herein by reference in its entirety.

TECHNICAL FIELD

The invention relates to a method for playing back applications from a Cloud.

In addition, the invention relates to a telecommunication network for streaming and reproducing applications (APPs) via a particular telecommunication system.

Moreover, the invention relates to the use of a telecommunication network for streaming and reproducing applications (APPs) via a particular telecommunication system.

PRIOR ART

The digitization of volumes of data has increased intensely in recent years and will continue to rise almost dramatically in the next few years. Digital communication between human beings, and not just in the private sector, but rather above all in the professional sector, is also playing an ever more important role. An instrument in this regard is what is known as a smartphone, specifically in particular in Asia, the USA and Europe. In these countries, most people have such a terminal.

If one looks at the economic strength of these areas and their gross national products, this is no longer surprising, since the people, but also the industrial firms, have sufficient financial means to afford such terminals. The situation looks different, however, in countries such as Africa, for example, or in what are known as emerging economies and countries that will be referred to as third-world countries, where the spread of smartphones is not possible as such on account of the low income. This hampers not only communication between people but also the spread of knowledge generally, not least also in the commercial sector.

Nowadays, it is ever more important to develop applications natively. Native developments are always individually matched to one particular platform, however. One problem, however, is that ever newer and more modern platforms come onto the market and users use not only one platform but rather many different platforms.

A further problem is the underlying hardware. Specific applications are also based on specific hardware. This hardware has to meet particular demands on the application, for example graphics load, processor capacity, memory, energy consumption. Conversely, however, an application can also call for more computation power or graphic power than the hardware of the platform can provide. Specifically in the case of graphics-intensive applications—for example games—this can lead to users not being able to use said applications, since the system is incompatible. Fundamentally, there are three different approaches to transferring applications to a non-platform-native environment.

First, there is what is known as native development (porting). The application is redeveloped from the point of view of the non-native platform. This is the most complex and time-consuming route of all three methods, but it affords the opportunity to use all the functionalities of the new platform. One problem with this method, however, is that the application is subject to the constraints of the platform. As such, for example, games having high graphics demands cannot be ported to a mobile platform. Different hardware prerequisites within the non-native platform are also a problem, since not every user has the same mobile radio, for example.

Additionally, software already exists that is intended to allow the developer to make native development easier. Porting takes place using particular software to the effect that parts of the existing software are replaced so as to achieve compatibility with the non-native system. This step is not always possible, since the architectures of some platforms differ from one another too greatly. There is usually also no support from the operator of the platform in such cases, and for this reason the native development is relied upon more often than not.

Web apps are applications that are developed on a web browser basis and can therefore be used on almost all platforms. In this regard, a WCM (Webcontent Management) system is also often used. However, these applications can be reached only by an appropriate browser, which the platform needs to provide. A disadvantage of this method is that not all applications can be ported using this method. It is necessary to use a browser that does not always ensure a native depiction of the application.

Streaming: this means that the application runs on a server and is only played back on the non-native platform by means of a client. This technology is currently restricted to particular applications, however, that are not time-critical (the keyword here is "latency").

WO 2012/037170 A1 discloses the practice of transmitting the application code to the client in parallel with the stream, in order, as soon as the application is executable on the client, to be able to terminate the stream, so that the application runs directly on the client, in order to be able to save streaming resources in this way. This may be of interest for consoles, for example, but is not possible under hardware-specific prerequisites (limitations).

WO 2009/073830 describes a system that provides the user with access to a service on the basis of a "subscription fee". In this case, the customer is assigned a particular streaming server for the period booked. Our system, however, assigns the user a geographical optimum streaming server without a "subscription fee" being needed.

Additionally, WO 2010/141522 A1 uses a game server, by means of which some of the streaming communication between client and streaming server takes place. In addition, the functionalities of the interactive layer are mapped via the video source, which is dealt with by means of a separate server in this development, in order to also provide third parties with access to advertising space, for example.

SUMMARY

The invention is based on the object of providing in particular, but nonexclusively, residents of countries who have a low income with a method that they can use to generally participate in the interchange of digitized volumes of data.

In addition, the invention is based on the object of equipping such economically underdeveloped countries with a telecommunication network that facilitates the interchange of digitized data even for low per-capita income.

Finally, the invention is based on the object of facilitating the use of a telecommunication network that also allow low-income layers of the population to take part in the interchange of digitized data.

Way of Achieving the Object Regarding the Method

This object is achieved by the features of patent claim 1.

BRIEF DESCRIPTION OF THE DRAWINGS

FIG. 2 illustrates a system according an embodiment.

DETAILED DESCRIPTION

Some Advantages

Figure 1:
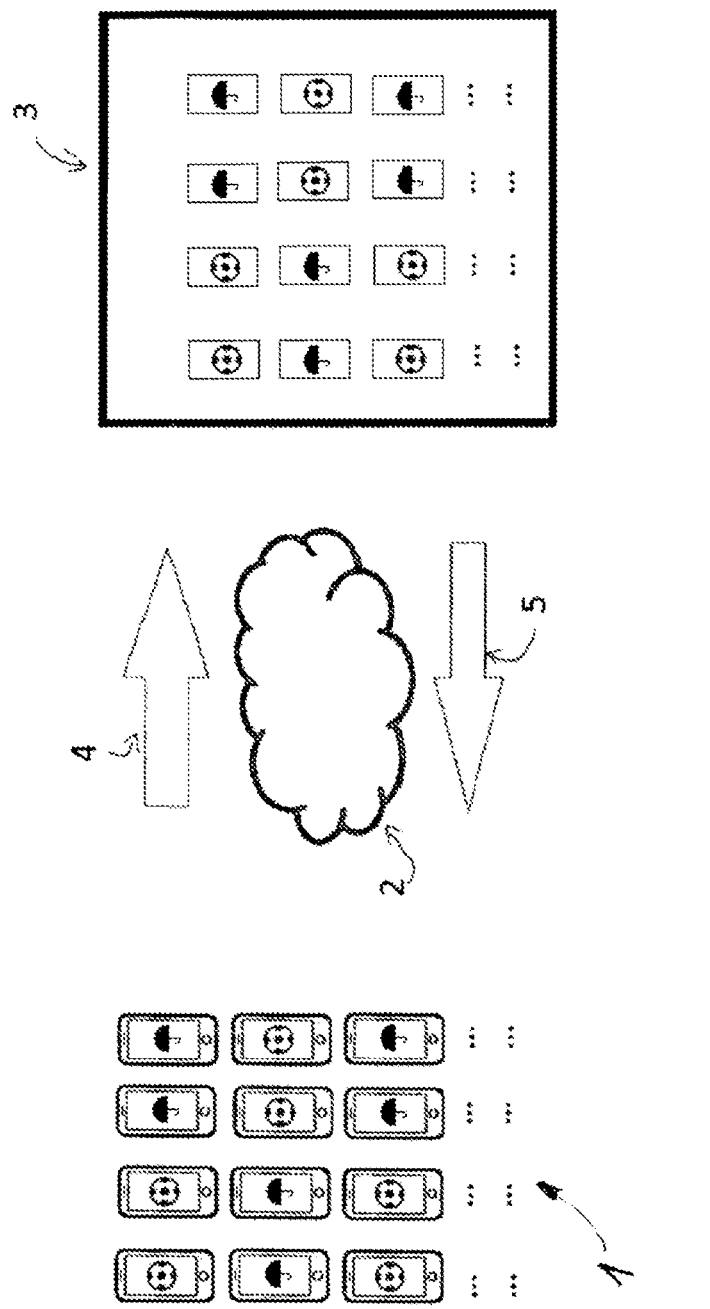
FIG. 1 illustrates a system according an embodiment.

A method according to the invention provides an inexpensive variant, since it allows a very simple device to be used to allow even low-income populations to take part in digitized data interchange basically without limitation. To this end, according to the invention, they need only a very simple and hence inexpensive terminal in the form of a mobile radio with a touchscreen, the mobile radio merely needing to contain a small processor that renders the customer and possibly also a WLAN or WiFi receiver/transmitter in order to transmit signals. The computer merely needs to be able to undertake minimal basic functions, for example processing user inputs via the touchscreen and playing back and rendering video streams. The specifications of the processor need only be very low. In this context, "rendering" is understood to mean the process that reproduces the image produced in the Cloud on the terminal. This therefore means that the computer power and the rendering take place in the Cloud. The end user with the mobile radio terminal is merely provided with a touchscreen equipped with simple menu guidance, such as e.g. by means of pictograms, which touchscreen he needs to tap in order to retrieve the respective information from the Cloud.

All in all, the hardware costs for the customer are therefore very low. This means that these devices can be sold even in low-income countries. In the meantime, smartphone-like functionalities can be provided on the basis of streaming technology, however. As the computation power or graphics power is placed in the Cloud, no compatibility problems with the hardware arise either and it is not necessary for a mobile radio terminal to be bought every two years. The full repurchase cycles disappear. For performing the method, the device therefore consists of just four components:

a) the touchscreen, which is responsible for the input and reproduction of the signals, with a touch digitizer and an LCT display,
b) the processor needed in order to start the streaming client. The latter is displayed on the touchscreen. The processor is responsible for rendering the client and the data.
c) The third unit is responsible for the communication between the network and the device. This may be a WLAN receiver, a WiFi receiver or a radio receiver.
d) Furthermore, a small local memory module is needed. This module can be used for different functionalities. As such it is possible, for example, for personal data to be stored or for this area to be declared a private memory by virtue of particular information being stored. It would thus be conceivable to create a virtual wallet from the device.

The method according to the invention therefore allows telecommunication between two devices via the aforementioned interfaces.

There is moreover an interaction. That is to say that the device allows playback of applications from the Cloud and a virtual wallet is also conceivable in which locally stored transaction data in the memory module are used, similarly to the BitCon system, to interchange information between individual devices.

Further Inventive Configurations

Patent claim 2 describes, as a further inventive configuration, a method for providing a platform-independent streaming technology that is programmed once and is portable to any telecommunication terminals, in which the streaming of the individual applications, for example video games or practical applications, is effected via a WAN such that a) a communication with the session server is performed by means of the telecommunication terminal (small applications);
b) a particular session is performed for a particular end customer for that streaming server of the relevant application, for example of a game, that is geographically closest to the telecommunication terminal;
c) session information is communicated to the telecommunication terminal and the streaming server by the relevant session server;
d) a direct connection is made between the telecommunication terminal and the streaming server of the relevant application, for example of a video game;
e) the setup of a direct connection between the telecommunication terminal and the relevant streaming server results in the following steps being initiated:
  i. recording of the audio/video data of the running application, for example of a game, via the relevant streaming server on which the game runs;
  ii. compression of the audio/video data by high-end hardware encoders;
  iii. transmission of the compressed audio/video data via WAN;
  iv. reception of the audio/video data on the part of the telecommunication terminal;
  v. decompression of the audio/video data;
  vi. visualization of the audio/video data on the telecommunication terminal (small);
  vii. recording of the actions (inputs) of the user of the telecommunication terminal, for example of a player, on the telecommunication terminal (small);
  viii. efficient transmission of the inputs back to the relevant streaming server of the game, and
  ix. reproduction of the transmitted inputs on the streaming server.

This method allows non-natively programmed applications to be played back on non-software-native environments, specifically without meeting the hardware-specific prerequisites of the non-native platforms, for example in regard to computer power and graphics power, and without meeting the software-specific prerequisites of the non-native platforms, for example applications that run only via one particular operating system. In comparison with U.S. 2014/0073428 A1, for example, the invention uses a client produced specifically for this application. This client can be used on any desired platform in order to ensure almost latency-free reproduction of an h.254-compressed stream. For transferring the frames, the h.254 code is used. H.264/MPEG-4 AVC is an H. standard for highly efficient video compression. The standard was adopted in 2003. The ITU designation in this case is H.264. For ISO/IEC MPEG, the standard runs under the designation MPEG-4/AVC (Advanced Video Coding) and is the tenth part of the MPEG-4 standard (MPEG-4/Part 10, ISO/IEC 14496-10). The method according to the invention involves, in addition, resource handling being used, which distributes the load over individual streaming servers in order to save firstly resources but secondly also capacities/investments. This allows the system to operate in a more cost-saving manner than comparable systems such as in WO 2012/37170 A1, for example. This also provides the opportunity to shut down streaming servers in the course of operation in order to perform maintenance work, for example. Generally, it is known that in almost all cases, such as in WO 2010/141522 A1, for example, it is always necessary for what is known as a hook in the code of the application to be initiated in order to allow the streaming server to stream the application. This results in the application code needing to be altered, which can lead firstly to additional expense but secondly to considerable problems with the original developer of the application. The method according to the invention makes a hook superfluous and allows the method to be automated.

The client application fundamentally consists of three parts (decode thread, render thread and the interactive layer) and is recorded in clientnetwork.so (shared library). These parts break down into individual modules.

The client session manager module is responsible for managing (starting/terminating) the session and is used for administrating the session started by the user. This module can also be used to make settings for latency optimization.

The network module undertakes the network communication and manages the communication with the streaming server.

The controller module intercepts the user input of the application and transmits it to the game streaming server.

The decoder-render audio module consists of two parts: the decoder module undertakes the decoding of the h.264 stream. The audio player plays the sound.

The evaluator module transmits reporting to the streaming server.

The recovery module undertakes negotiation of the strategies for corrupt frames.

The client UI module is incorporated in the interactive layer and is responsible for the UI of the application.

The interactive layer allows an additional visual depiction of information to be visualized on the underlying render thread, for example in order to display community feature/help or advertising. It is above the render thread and can be adjusted individually by the user.

For the interactive layer, a predefined user interface is provided for each platform. However, the user can use what is known as layer scripting to produce the applicable user interface, under certain constraints, himself. Layer scripting provides the user with a specially developed scripting environment that allows particular functionalities to be linked to predefined buttons. As such, the user can individually match his UI to their needs.

The streaming server fundamentally consists of three modules (network thread, GPU thread and session handler) and is recorded in servernetwork.dll (shared library). Each running application on the streaming server is assigned a GPU and a network thread. This automatic process is managed by the session handler.

The network thread is responsible for delivering the encoded audio and video file.

The GPU thread is responsible for the hardware encoding of the audio and video frames of the application, undertakes packet buffering via UDP/TCP and undertakes timestamping and compression.

The session handler is responsible for starting/stopping and managing the GPU & network threads. It coordinates available resources on the game streaming server and communicates with the session management server. The idea behind the session handler is automatic management of the resources in order to be able to save costs.

The session management server consists of four modules: authentication module; network module; session manager module; evaluator module.

Authentication of the client is undertaken by the access server, in order firstly to store the client specifications for the streaming server, in order to check whether the client is entitled to retrieve the requested application. The authentication can also work vis a vis with a third-party system, so that non-native systems can also be connected.

The network module is responsible for load balancing, quality assurance and administration. Load balancing is understood to mean even distribution of the load within the network. In the area of quality assurance, every single stream is monitored and optimized on the basis of performance (for example by means of particular routing). Administration is intended to allow the administrator to inspect the current load and the routing in order to perform particular configurations.

The session manager module is responsible for load optimization and control of the game streaming servers. This unit links incoming client requests to a free slot on a game streaming server and then sets up a direct connection between client and streaming server. Crucial criteria for linking are: latency between streaming server and application client and available resources. The aim is to use this unit to establish a resource-saving method in order to be able to disconnect unused power.

Evaluator module. This undertakes generation of the statistics and administration and is used for further optimization.

The content server undertakes the display of advertising on the interactive layer of the applicable client for the relevant game. Advertising can be displayed in multiple forms. Either permanent placement takes place within the application or particular times are predefined that, as soon as they are activated, set an appropriate trigger to display advertising.

UDP (User Datagram Protocol) is simple, less expensive and more efficient for realtime data transmissions. The problem with UDP, however, is that there is no mechanism for dealing with data packets that have been lost in the network. Therefore, screen errors, stutters and flicker arise while the game is being played in the Cloud.

We have defined four strategies that will intelligently correct the packet loss situation.

Blocking: strategy at the user end which involves a still image being shown while error correction takes place. This will allow the user to have a better user experience in comparison with screen errors, stutters and flicker. Therefore, this method will ensure that the image is not erroneous in the event of packet loss.

Not blocking: strategy at the user end that involves no still image being produced while transmission of the lost packets is requested from the server. This fresh transmission is not comparable with the TCP transmission, since it is under our own control and we efficiently request it only when it is needed.

Intrarefresh: this strategy is implemented at the user end, speaking to the video encoder (at the server end) at runtime. In the event of the loss of a packet, it asks the encoder to perform a frame refresh. Therefore, a frame refresh unnoticeable to the naked eye is applied to the image in milliseconds as soon as said image is interrupted on account of a loss of image packets.

Frame validation: this strategy keeps an eye on the frame rate at which images are sent from the server end. In the case of a fluctuating frame rate, it ensures that the image packets are sent at a constant frame rate. This helps to ensure a uniform image experience in this case.

A particularly advantageous approach is characterized by patent claim 3. This is characterized in that terminals with different operating systems, for example terminals having Android software and/or terminals having iOS software, operate in one and the same telecommunications system with apps, wherein the applications loaded on one terminal, when changing to another terminal, operating with different software, e.g. Android software, the applications previously loaded on the earlier terminal continue to be used without alteration by the new terminal on the new terminal without renewed purchase of the applications by means of an identification method of the earlier terminal, which operated with different software. To date, terminal users, for example mobile radio users, when changing operating system, for example from the iOS operating system to the Android operating system, have had to repurchase the apps. The invention now demonstrates a way in which this can be avoided. Accordingly, it is no longer necessary to repurchase previously purchased apps when changing operating systems. Rather, the method according to the invention allows the previously purchased and used apps to continue to be used on the new operating system. Moreover, terminal users using different operating systems, for example iOS operating system and/or Android operating system, can shop in any stores. For this, patent claim 4 also describes a further advantageous approach.

Way of Achieving the Object Regarding the Telecommunication Network

This object is achieved according to patent claim 5 by a telecommunication network for streaming and reproducing applications (APPs) via a particular telecommunications system, in which one or more streaming servers, which can contact one another by telecommunication, execute the relevant application and which make contact with the respective telecommunication terminal locally, wherein the relevant telecommunication terminal retrieves the demanded application from a local server that makes the computer power for rendering and encoding the relevant application available.

The telecommunication network according to patent claim 6 is used for reproducing applications on non-application-native system environments, said system environments differing either by virtue of different hardware components or by virtue of different software components, wherein the streaming server undertakes the handling of different applications and the rendering/encoding of the application and the audio and video signals of said streaming server, wherein the data are transmitted to the respective telecommunication terminal—mobile radio, tablet, laptop, PC, TV—and the transmission is performed by means of modified h.254 protocol and the WAN is used as a transmission means for audio/video packets by UDP/TCP and the complete computer power is undertaken by the relevant streaming server, wherein the packaged data are decoded only on the telecommunication terminal.

The telecommunication network according to patent claim 7 is provided with a telephone terminal, which has a touchscreen having symbols for inputting and reproducing signals, having a processor, in order to start the streaming client, which is displayable on the touchscreen, and which is responsible for rendering the client, and a further communication device, for example a WLAN receiver or a radio receiver, for communication between the Cloud and the terminal and also a local memory module, wherein the telecommunication terminal is used for communication between two or more devices via said interfaces and for playing back applications from the Cloud or for playing back locally stored transaction data from a memory module.

Patent claim 8 claims a preferred telecommunication network. This allows continued use of previously bought apps when changing between different operating systems. The telecommunication network is characterized in that terminals of different operating systems, for example terminals with Android software and/or terminals with iOS software, operate in one and the same telecommunication system with apps, wherein the applications loaded on one terminal, when changing to another terminal, operating with different software, e.g. Android software, the applications previously loaded on the earlier terminal continue to be used without alteration by the new terminal on the new terminal without renewed purchase of the applications by means of an identification method of the earlier terminal, which operated with different software.

A further advantageous embodiment is described in patent claim 9, which is characterized in that the terminals operating with different operating systems—e.g. iOS terminals and/or Android terminals—use the same app stores, e.g. iOS stores and/or Google Play stores, using an authentication method.

Way of Achieving the Object Regarding the Use

This object is achieved according to patent claim 10 by a telecommunication network for streaming and reproducing applications (APPs) via a particular telecommunication system, in which one or more streaming servers, which can contact one another by telecommunication, execute the relevant application and which make contact with the respective telecommunication terminal locally, wherein the relevant telecommunication terminal retrieves the demanded application from a local server that makes the computer power for rendering and encoding the relevant application available.

Patent claim 11 describes the use of a telecommunication network for reproducing applications on non-application-native system environments, said system environments differing either by virtue of different hardware components or by virtue of different software components, wherein the streaming server undertakes the handling of different applications and the rendering/encoding of the application and the audio and video signals of said streaming server for the individual frames, wherein the data are transmitted to the respective telecommunication terminal—mobile radio, tablet, laptop, PC, TV—and the transmission is performed by means of modified h.254 protocol and the WAN is used as a transmission means for audio/video packets by UDP/TCP and the complete computer power is undertaken by the relevant streaming server, wherein the packaged data are decoded only on the telecommunication terminal.

According to patent claim 12, the characterization relates to the use of a telecommunication system for providing a platform-independent streaming technology, which is programmed once and is portable to any telecommunication terminals, in which the streaming of the individual applications, for example video games, is effected via a WAN such that a) a communication with the session server is performed by means of the telecommunication terminal (small applications);
b) a particular session is performed for a particular end customer for that streaming server of the relevant application, for example of a game, that is geographically closest to the telecommunication terminal;
c) session information is communicated to the telecommunication terminal and the streaming server by the relevant session server;
d) a direct connection is made between the telecommunication terminal and the streaming server of the relevant application, for example of a video game;
e) the setup of a direct connection between the telecommunication terminal and the relevant streaming server results in the following steps being initiated:
  i. recording of the audio/video data of the running application, for example of a game, via the relevant streaming server on which the game runs;
  ii. compression of the audio/video data by high-end hardware encoders;
  iii. transmission of the compressed audio/video data via WAN;
  iv. reception of the audio/video data on the part of the telecommunication terminal;
  v. decompression of the audio/video data;
  vi. visualization of the audio/video data on the telecommunication terminal (small);
  vii. recording of the actions (inputs) of the user of the telecommunication terminal, for example of a player, on the telecommunication terminal (small);
  viii. efficient transmission of the inputs back to the relevant streaming server of the game, and
  ix. reproduction of the transmitted inputs for applications on the streaming server.

Patent claim 13 shows the use of a telecommunication network for communication with a client (user, terminal) having the following source code:

```
/*********************AddPortAsynchronisation.java***********************
Responsible for adding relevant ports to network devices to make ensure
smooth communication, technology targets a technique that can run
independent of network hardware [responsible for enabling relevant ports in
the network device (for example router) so as to ensure smooth
communication. This technique allows universal use regardless of the
network hardware of the user.]
***********************************************************************/
    package org.cloundgaming4u.client.portforwarding;
    import java.io.IOException;
    import net.sbbi.upnp.messages.UPNPResponseException;
    import android.content.Context;
    import android.os.AsyncTask;
    import android.util.Log;
    public class AddPortAsync extends AsyncTask<Void, Void, Void> {
    private Context context;
    private UPnPPortMapper uPnPPortMapper;
    private String externalIP;
    private String internalIP;
    private int externalPort;
    private int internalPort;
    public AddPortAsync(Context context,UPnPPortMapper uPnPPortMapper, String
    externalIP, String internalIP,
    int externalPort, int internalPort) {
    this.context = context;
    this.uPnPPortMapper = uPnPPortMapper;
    this.externalIP = externalIP;
    this.internalIP = internalIP;
    this.externalPort = externalPort;
    this.internalPort = internalPort;
    }
    @Override
    protected void onPreExecute( ) {
    super.onPreExecute( );
    if(uPnPPortMapper == null)
    uPnPPortMapper = new UPnPPortMapper( );
    }
    @Override
    protected Void doInBackground(Void... params) {
    if(uPnPPortMapper != null)
    {
    try
    {
    Log.d("cg4u_log","Contacting Router for setting network configurations");
    if(uPnPPortMapper.openRouterPort(externalIP,
```

```
externalPort,internalIP,internalPort, "CG4UGames"))
{
Log.d("cg4u_log",String.format("Setting network configurations successful
IP:%s Port:%d",externalIP,externalPort)):
Log.d("cg4u_log",String.format("Setting network configurations successful
IP:%s Port:%d",internalIP,internalPort));
}
}
catch (IOException e)
{
e.printStackTrace( );
}
catch (UPNPResponseException e)
{
e.printStackTrace( );
}
}
return null;
}
@Override
protected void onPostExecute(Void result) {
super.onPostExecute(result);
//Send broadcast for update in the main activity
//Intent i = new Intent(ApplicationConstants.APPLICATION_ENCODING_TEXT);
//context.sendBroadcast(i);
}
}
/*************************UniversalPortMapper.java*********************
Responsible for making sure that random port generated by server is
dynamically [responsible for the generic port assignment of the server].
mapped at
client end
*************************************************************************/
    package org.cloundgaming4u.client.portforwarding;
    import net.sbbi.upnp.impls.InternetGatewayDevice;
    import net.sbbi.upnp.messages.UPNPResponseException;
    import java.io.IOException;
    public class UPnPPortMapper {
    private InternetGatewayDevice[ ] internetGatewayDevices;
    private InternetGatewayDevice foundGatewayDevice;
/**
* Search for IGD External Address
* @return String
*/
public String findExternalIPAddress ( ) throws IOException, UPNPResponseException
{
/** Upnp devices router
search*/
if(internetGatewayDevices == null)
{
internetGatewayDevices =
InternetGatewayDevice.getDevices(ApplicationConstants.SCAN_TIMEOUT);
}
if(internetGatewayDevices != null)
{
for (InternetGatewayDevice IGD : internetGatewayDevices)
{
foundGatewayDevice = IGD;
return IGD.getExternalIPAddress( ).toString( );
}
}
return null;
}
/**
* Search Found Internet Gateway Device Friendly Name
* @return
*/
public String findRouterName( ){
if(foundGatewayDevice != null){
return foundGatewayDevice.getIGDRootDevice( ).getFriendlyName( ).toString( );
}
return "null";
}
/**
* Open Router Port
* IGD == Internet Gateway Device
*
* @param internalIP
* @param internalPort
```

-continued

```
* @param externalRouterIP
* @param externalRouterPort
* @param description
* @return
* @throws IOException
* @throws UPNPResponseException
*/
public boolean openRouterPort(String externalRouterIP,int externalRouterPort,
String internalIP,int internalPort,
String description)
throws IOException, UPNPResponseException {
/** Upnp devices router
search*/
if(internetGatewayDevices == null){
internetGatewayDevices =
InternetGatewayDevice.getDevices(ApplicationConstants.SCAN_TIMEOUT);
}
if(internetGatewayDevices != null){
for (InternetGatewayDevice addIGD : internetGatewayDevices) {
/** Open port for TCP protocol and also for UDP protocol
* Both protocols must be open this
is a MUST*/
//addIGD.addPortMapping(description, externalRouterIP, internalPort,
externalRouterPort, internalIP, 0, ApplicationConstants.TCP_PROTOCOL);
addIGD.addPortMapping(description, externalRouterIP, internalPort,
externalRouterPort, internalIP, 0, ApplicationConstants.UDP_PROTOCOL);
}
return true;
}else{
return false;
}
}
public boolean removePort(String externalIP,int port) throws IOException,
UPNPResponseException{
/** Upnp devices router
search*/
if(internetGatewayDevices == null){
internetGatewayDevices = InternetGatewayDevice.getDevices(5000);
}
/**Remote port mapping for all routers*/
if(internetGatewayDevices != null){
for (InternetGatewayDevice removeIGD : internetGatewayDevices) {
// removeIGD.deletePortMapping(externalIP, port,
ApplicationConstants.TCP_PROTOCOL);
removeIGD.deletePortMapping(externalIP, port, "UDP");
}
return true;
}else{
return false;
}
}
}
****************************************************************
                End of ClientNetworkCommunication
****************************************************************
```

Patent claim 14 describes a further preferred mode of use, for streaming and reproducing applications (APPs) via a particular telecommunication system, in which terminals with different operating systems, for example terminals having Android software and/or terminals having iOS software, operate in one and the same telecommunications system with apps, wherein the applications loaded on one terminal, when changing to another terminal, operating with different software, e.g. Android software, the applications previously loaded on the earlier terminal continue to be used without alteration by the new terminal on the new terminal without renewed purchase of the applications by means of an identification method of the earlier terminal, which operated with different software.

The mode of use according to patent claim 15 is characterized in that the terminals operating with different operating systems—e.g. iOS terminals and/or Android terminals—use the same app stores, e.g. iOS stores and/or Google Play stores, using an authentication method.

The drawing illustrates the approach—in part schematically—using exemplary embodiments.

The communication between various mobile radio terminals equipped with touch screens equipped terminals via a Cloud and a streaming server.

Reference sign 1 is used to depict a total of twelve views of a touch screen of a mobile radio terminal, the touch screen being used to depict various symbols by means of which the mobile radio user can retrieve applications from the Cloud 2, which communicates with a streaming server 3. The streaming server 3 has all of the data required for communication with the mobile radio terminal 1, which means that the computer power in the mobile radio terminal 1 can be very low. The processor can have a minimal power, the various applications being depicted by symbols on the touch screen. These symbols conceal volumes of data that are retrieved from the streaming server 3 via the Cloud 2.

4 signifies the path of a control signal from the mobile radio terminal 1 and 5 signifies the path of a video signal from the streaming server 3 to the mobile radio terminal 1.

In FIG. 2, reference signs 6 and 7 denote telecommunication terminals, for example mobile radios or tablets, on which views, not depicted,—symbols—, as in the embodiment shown in FIG. 1 are depicted, via which the respective touch screen of the telecommunication terminals 6 and 7 can be used to retrieve applications. Instead of mobile radios, it is also possible for tablets, laptops or the like to be used.

The terminals 6 and 7 are connected, for signaling or radio purposes, as required, via signal paths 8 or 9 to a Cloud 10, from which the applications can be retrieved. The terminals 6 and 7 thus have a low computer power. The Cloud 10 communicates, as in the embodiment shown in FIG. 1, with a streaming server 11 that has all of the data required for communication with the telecommunication terminals 6 and 7, as a result of which the computer power in the telecommunication terminals 6 and 7 can be kept low. Naturally, the two depicted telecommunication terminals 6 and 7 serve only to provide an example. In practice, fewer or very many more terminals may be provided, depending on how many users wish to connect to the Cloud 10 and retrieve applications. It is also not necessary to have only one Cloud 2 or 10. Depending on requirements, there may also be multiple or numerous such Clouds provided, with which multiple or a multiplicity of telecommunication terminals 6 and 7 and the like communicate and that contain the respective data for applications.

The Cloud 10 is connected to various stores 12 or 13 via the signal paths 17 or 18 for signaling purposes, the number of stores 12, 13 evident from the drawing likewise being only exemplary indications. There may be only one such store or a multiplicity of stores provided, from which applications are retrievable. For example, the store 12 may be an iOS store, while the store 13 is a Google Play store.

The telecommunication terminal 6 may be an Ipad/mobile radio, for example, while the terminal 7 is a laptop or mobile radio terminal operating on the basis of the Android standard.

To date, it was the case that the user of apps on a telecommunication terminal, for example a mobile radio, when changing his device to a different operating system, for example from a terminal with iOS to a terminal operating on the basis of the Android standard, had to purchase the apps loaded on the previous terminal again. This is now no longer necessary according to the invention, because, via the Cloud 10, the various telecommunication terminals 6 and 7 can draw on any stores 12 or 13, regardless of the standard on which they operate. If the telecommunication terminal 6 is an Ipad/mobile radio terminal operating on the basis of the iOS standard, for example, it uses the Cloud 10, when an app is retrieved via the signal path 14, to communicate with the streaming server 11, which checks the authorization of the user of the telecommunication terminal 6. The signal path 15 is then used to give clearance via the Cloud 10 to the telecommunication terminal 6 via the signal path 8. If the user of the telecommunication terminal 6 changes from iOS standard, for example, to the telecommunication terminal 7, which operates on the basis of the Android standard, for example, he can continue to use the apps previously used on the terminal 6 on his new telecommunication terminal 7 without repurchasing the apps. Using the signal path 9 and the Cloud 10 and the signal path 14, the streaming server 11 checks the authorization of the user of the telecommunication terminal 7 using an authentication method to ascertain whether he is authorized to use the app, then uses the signal path 14 and the Cloud 10 and the signal path 9 to release the relevant application for the user of the terminal 7, who can then draw on one of the stores 12 or 13. The same also applies, according to the depiction, for the user of the telecommunication terminal 6, so that it is possible both for an Android user 7 to use an iOS store 12 and for a user of the telecommunication terminal 6, which operates on the basis of the iOS standard, to draw on the store 13, for example a Google Play store, for example.

The features described in the patent claims and the description and evident from the drawing may be essential to the implementation of the invention either individually or in any combinations.

REFERENCE SIGNS

1 Views/apps of a mobile radio terminal
2 Cloud
3 Streaming server
4 Control signal, signal path
5 Video signal, signal path
6 Telecommunication terminal
7 "
8 Signal path
9 "
10 Cloud
11 Streaming server
12 Store
13 "
14 Signal path
15 "
16 -
17 "
18 "

Explanation of Terms

Client A client (also client application) denotes a computer program that is executed on a terminal of a network and communicates with a central server.
Client UI module Client user interface module
Cloud Combination of multiple servers on the Internet
codec Encoder/decoder
Decode thread Decoding application
Decoder render Decoding executer
Render thread Visualization executer; is responsible for rendering [visualizing] the application.
Timestamping Describes the assignment of a date to a data packet
UDP User Datagram Protocol
UI layer User interface layer References

WO 2009/073830 A1
WO 2010/141522 A1
WO 2012/037170 A1
US 2014/0073428 A1

The invention claimed is:
1. A method for playing back an application from a cloud using one or more mobile terminals, the method including:
retrieving the application from the cloud via a first mobile terminal of the one or more terminals, wherein computing power, including graphics power, for executing the application is placed in the cloud;
loading the application on a second mobile terminal of the one or more mobile terminals, wherein the second mobile terminal has different software than the first mobile terminal;

wherein the loading further includes porting the application to the second mobile terminal via a client of the second mobile terminal without a hook and without alteration by the second mobile terminal, the loading being based on a result of an identification process associated with the first mobile terminal;

wherein the application loaded via the client is configured to be authenticated for use on the second mobile terminal via a first signal path associated with the first mobile terminal, the first signal path being configured to establish communication between a server which executes the identification process, and wherein the first signal path is subsequently used to give clearance via the cloud to the the second mobile terminal to access the application via a second signal path different than the first signal path, the signal path being associated with the second mobile terminal.

2. The method set forth in claim 1, wherein the server is a streaming server.

3. The method as set forth in claim 1, wherein the loading is effected via a WAN.

4. The method as set forth in claim 3, wherein the server is further configured to effect compression of audio/video data using hardware encoders prior to the loading.

5. The method as forth in claim 3, wherein a session is established to the server based on geographical information relating to the first mobile terminal or the second mobile terminal.

6. The method as set forth in claim 3, wherein the method further includes establishing a session between the second mobile terminal and the server via the cloud, the establishing including:
  i. recording of audio/video data associated with the application;
  ii. compressing the audio/video data using hardware encoders; and
  iii. transmitting the compressed audio/video data via a WAN.

7. The method as forth in claim 6, wherein the loading further includes
  i. retrieving the compressed audio/video data by the second mobile terminal;
  ii. decompressing the audio/video data; and
  iii. recording input data from the second mobile terminal in response to executing the decompressed audio/video data on the second mobile terminal;
  iv. transmitting the recorded input data to the server; and
  v. reproducing the transmitted recorded input data on the server.

* * * * *